United States Patent
Wickboldt et al.

(10) Patent No.: US 11,842,563 B2
(45) Date of Patent: *Dec. 12, 2023

(54) OPTICAL FINGERPRINT SENSOR WITH SPOOF DETECTION AND ASSOCIATED METHOD

(71) Applicant: OmniVision Technologies, Inc., Santa Clara, CA (US)

(72) Inventors: Paul Wickboldt, Walnut Creek, CA (US); Jau-Jan Deng, Taipei (TW); Shih-Hsin Hsu, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/469,461

(22) Filed: Sep. 8, 2021

(65) Prior Publication Data

US 2023/0072103 A1   Mar. 9, 2023

(51) Int. Cl.
*G06V 40/12*       (2022.01)
*G06F 3/041*       (2006.01)
*G06F 3/042*       (2006.01)
*G06V 40/13*       (2022.01)

(52) U.S. Cl.
CPC ........ *G06V 40/1394* (2022.01); *G06F 3/0428* (2013.01); *G06F 3/04166* (2019.05); *G06V 40/1318* (2022.01); *G06V 40/1365* (2022.01)

(58) Field of Classification Search
CPC .......... G06V 40/1394; G06V 40/1318; G06V 40/1365; G06F 3/04166; G06F 3/0428
USPC ...................................................... 382/128
See application file for complete search history.

(56) References Cited

U.S. PATENT DOCUMENTS

| | | | |
|---|---|---|---|
| 10,102,411 B2 | 10/2018 | Lillie et al. | |
| 10,438,046 B2 | 10/2019 | He et al. | |
| 11,410,412 B2 * | 8/2022 | Yang ................. | G06V 40/1318 |
| 2006/0202028 A1 | 9/2006 | Rowe et al. | |
| 2008/0192988 A1 | 8/2008 | Uludag et al. | |

(Continued)

OTHER PUBLICATIONS

U.S. Appl. No. 17/469,508 Notice of Allowance dated Sep. 14, 2022, 12 pages.

(Continued)

*Primary Examiner* — Edward F Urban
*Assistant Examiner* — Wassim Mahrouka
(74) *Attorney, Agent, or Firm* — COZEN O'CONNOR (57) ABSTRACT

An optical fingerprint sensor with spoof detection includes a plurality of lenses, an image sensor including a pixel array that includes a plurality of first photodiodes and a plurality of second photodiodes, and at least one apertured baffle-layer having a plurality of aperture stops, wherein each second photodiode is configured to detect light having passed through a lens and at least one aperture stop not aligned with the lens along an optical axis. A method for detecting spoof fingerprints detected using an optical fingerprint sensor includes detecting large-angle light incident on a plurality of anti-spoof photodiodes, wherein the plurality of anti-spoof photodiodes is interleaved with a plurality of imaging photodiodes, determining an angular distribution of light based at least in part one the large-angle light, and detecting spoof fingerprints based at least in part on the angular distribution of light.

18 Claims, 6 Drawing Sheets

(56) References Cited

U.S. PATENT DOCUMENTS

2015/0078636 A1    3/2015  Carver et al.
2017/0161540 A1    6/2017  Mienko et al.

OTHER PUBLICATIONS

U.S. Appl. No. 17/469,461, filed Sep. 8, 2021, Paul Wickboldt.
U.S. Appl. No. 17/469,473, filed Sep. 8, 2021, Paul Wickboldt.
U.S. Appl. No. 17/469,565, filed Sep. 8, 2021, Paul Wickboldt.
U.S. Appl. No. 17/469,508, filed Sep. 8, 2021, Paul Wickboldt.

* cited by examiner

OPTICAL FINGERPRINT SENSOR WITH SPOOF DETECTION AND ASSOCIATED METHOD

BACKGROUND

Fingerprint sensing is becoming an increasingly common tool for authorizing (a) access to electronic devices, such as smartphones, (b) access to confidential electronic records, and (c) electronic transactions such as financial transactions carried out over the Internet. Fingerprint sensing satisfies market demand for an authentication mechanism that eliminates the need to enter (and remember) a passcode, and also eliminates the need to keep track of multiple different passcodes associated with different devices and/or accounts. Fingerprint sensing is a well-established form of biometric identification and optical fingerprint sensors have been used for years, e.g., by law enforcement agencies.

Several different types of fingerprint sensors have been designed for use in smartphones and other mobile devices. Each of these types of fingerprint sensors images a finger to obtain the fingerprint. A camera-based fingerprint scanner captures an image of a fingerprint using an imaging lens and an image sensor. A collimator-based fingerprint scanner senses a fingerprint with a lens array aligned over an image sensor with the addition of a collimator above the image sensor. The collimator helps map light from a specific region of the fingerprint sample to be detected by a corresponding region of the image sensor by forming channels the light must propagate through to reach the image sensor.

One issue with fingerprint image sensing is the possibility of generating fake, or spoof, fingerprints that trick the fingerprint sensor in order to gain access to a device. Spoof fingerprints can be fabricated in a range of ways including printing an image of the fingerprint on paper and forming molded objects that reproduce the desired fingerprint pattern. If created with sufficiently high resolution and fidelity to the real fingerprint, these spoofing methods can trick fingerprint sensors and allow unauthorized access to devices and accounts. Fingerprint sensors based on image sensors struggle to distinguish real fingerprints from spoof fingerprints, thereby making fingerprint sensors a less reliable authentication method.

SUMMARY OF THE INVENTION

Collimator-based fingerprint sensors narrow the acceptable paths that electromagnetic energy may travel between the fingerprint sample and the image sensor. In some instances, they do so by forming channels or cones that transmit electromagnetic energy but block incoming electromagnetic energy with angles and positions not within this intended path. This allows electromagnetic energy from a specific region of the fingerprint sample to reach only the region of the image sensor intended to image that region of the fingerprint and reduces electromagnetic energy from any other region of the fingerprint sample from reaching that region of the image sensor. This can be accomplished in several ways including an array of apertured baffle-layers positioned between a lens array and the image sensor. Each apertured baffle-layer has apertures aligned above each pixel of the image sensor, with the width of each aperture configured to transmit only a narrow cone of acceptable angles of incoming electromagnetic energy. This design has been used to help improve image quality and performance of under-screen fingerprint sensors. The term "light" and the term "electromagnetic energy" are used interchangeably herein. Electromagnetic energy herein refers to electromagnetic energy with wavelength between 0.4 and 2 microns.

Techniques exist to overcome fingerprint sensors and gain unauthorized access to devices and information including creating spoof fingerprints. Spoof fingerprints include printed images of fingerprints and molded objects that reproduce the three-dimensional structure of the target fingerprint sample. Current techniques to detect spoof fingerprints largely rely on reviewing real and spoof fingerprints and using algorithms to detect the differences in the images generated of each by the fingerprint sensor. As spoof fingerprints are made with higher resolution and fidelity, the images they produce on the fingerprint sensor become challenging to distinguish from real fingerprint samples. Using only the image is a limitation for spoof detection and leaves fingerprint sensors vulnerable to high-quality, high-resolution spoof fingerprint attacks.

When printed or molded spoof fingerprint samples are used on fingerprint sensors, the material properties of the sample play a role in how electromagnetic energy interacts between the sample and the fingerprint sensor. This can be exploited to increase spoof detection. Electromagnetic energy is scattered from the sample with a range of outgoing angles. This distribution of scattered electromagnetic energy depends on the material being sampled. Human fingers, printed images, and molded objects may produce the same image on the image sensor but they produce different angular distributions of reflected and scattered electromagnetic energy. A fingerprint sensor capable of detecting this angular distribution has superior ability to detect spoofs than one which only records an image of the sample.

Detecting the angular distribution of electromagnetic energy is possible by exploiting the physical design of an apertured baffle-layer collimator that may be used in an optical fingerprint sensor. By design, electromagnetic energy with a small angle of incidence, which is to say with a small angular divergence from the surface normal of the image sensor, is transmitted through the collimator to a pixel of the image sensor corresponding to a physical location on the fingerprint sample from which the electromagnetic energy originated. These pixels of the image sensor are called imaging pixels, herein. Generally, an imaging pixel is aligned with at least one aperture and a given lens along a line roughly parallel to the surface normal of the image sensor. Electromagnetic energy traveling toward the fingerprint sensor with sufficiently large angle of incidence may traverse through a given lens and then through apertures not aligned with that lens, after which it may be incident on image sensor between adjacent imaging pixels. This light is generally not useful for imaging the fingerprint sample and is thus disregarded. In the embodiments described herein, electromagnetic energy with large angle of incidence, so called large-angle light, is detected and used to measure the veracity of a fingerprint sample. By detecting large-angle light, the fingerprint sensor records additional information about the sample that can be used to confirm whether a sample is a real finger or a spoof finger.

When employing algorithms to detect spoof fingerprints, the additional information provided by detecting large-angle light may also be inputted into the algorithms for enhanced spoof-detection accuracy. This is especially valuable with the use of machine learning algorithms, which automatically compare differences between training sets. Variations in angular distributions that are caused by material properties of the sample will be available to machine learning algorithms, which will be able to identify spoof fingerprints based on combination of image details and angular distribution.

An optical fingerprint sensor with spoof detection includes a plurality of lenses $L_{m=0}, L_1, \ldots L_{J-1}$ with a lens pitch along a horizontal direction that is orthogonal to a lens axis of lens $L_0$, each lens having a width; an image sensor including a pixel array that includes a plurality of first photodiodes $I_{m=0}, I_1, \ldots, I_{J-1}$ with a first photodiode pitch that is equal to the lens pitch in the horizontal direction, a line between a center of a light-sensitive surface of each first photodiode $I_m$ and an optical center of each lens $L_m$ forms an optical axis $O_m$ of a plurality of optical axes $O_{m=0}, O_1, \ldots O_{J-1}$ that are normal to a light-sensitive surface of the pixel array; at least one apertured baffle-layer positioned between the image sensor and the plurality of lenses, each of the at least one apertured baffle-layer located at a respective height $z_k$ above the pixel array and each having a respective plurality of aperture stops $A_{m=0}, A_1, \ldots A_{J-1}$, each aperture stop $A_m$ being center-aligned with the optical axis $O_m$; and a plurality of second photodiodes $S_{m=0}, S_1, \ldots S_{K-1}$ that is included in the pixel array, the plurality of second photodiodes is intercalated with the plurality of first photodiodes such that a second photodiode $S_m$ is between first photodiode $I_m$ and first photodiode $I_{m+1}$ in the horizontal direction, wherein each second photodiode is configured to detect electromagnetic energy having passed through lens $L_m$ and at least one aperture stop $A_{x \neq m}$ not aligned with $L_m$ along optical axis $O_m$.

A method for detecting spoof fingerprints detected using an optical fingerprint sensor includes detecting large-angle light incident on a plurality of anti-spoof photodiodes of a pixel array, large-angle being electromagnetic energy incident on a lens above the pixel array with incident angle divergent from the optical axis of the lens by greater than five degrees; wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes; determining an angular distribution of electromagnetic energy based at least in part on the detected large-angle light; and detecting spoof fingerprints based at least in part on the angular distribution of electromagnetic energy.

DETAILED DESCRIPTION OF THE EMBODIMENTS

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" may encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it may be the only layer between the two layers, or one or more intervening layers may also be present.

The term semiconductor substrate may refer to substrates formed using semiconductors such as silicon, silicon-germanium, germanium, gallium arsenide, and combinations thereof. The term semiconductor substrate may also refer to a substrate, formed of one or more semiconductors, subjected to previous process steps that form regions and/or junctions in the substrate. A semiconductor substrate may also include various features, such as doped and undoped semiconductors, epitaxial layers of silicon, and other semiconductor structures formed upon the substrate.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Figure 1A:
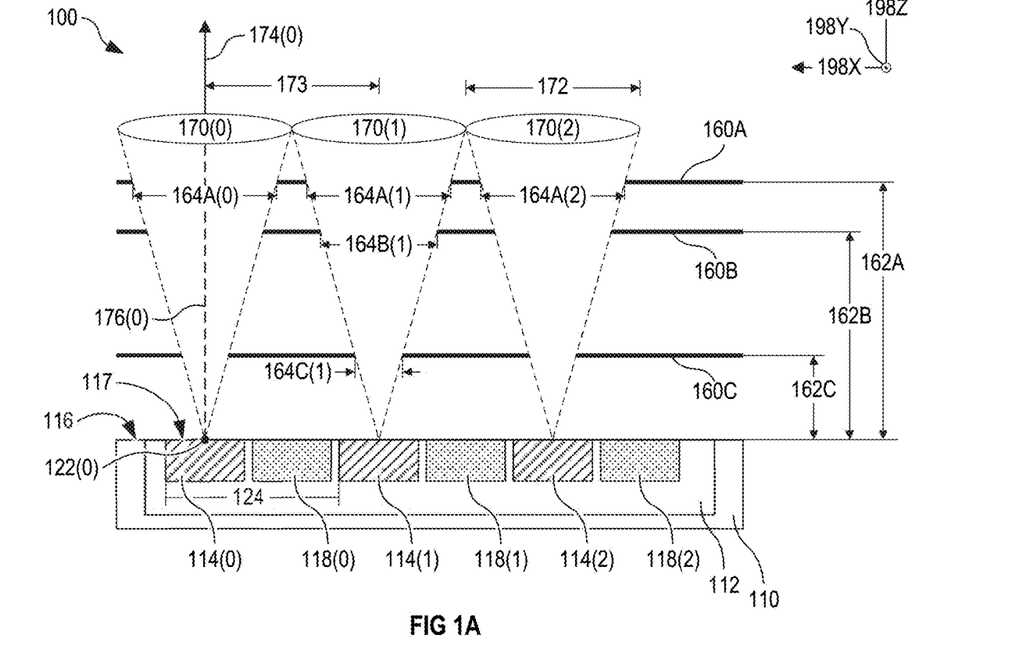
FIGS. 1A and 1B illustrate a cross-sectional side view of an optical fingerprint sensor that detects light with a plurality of second photodiodes to identify spoof fingerprints.
Figure 1B:
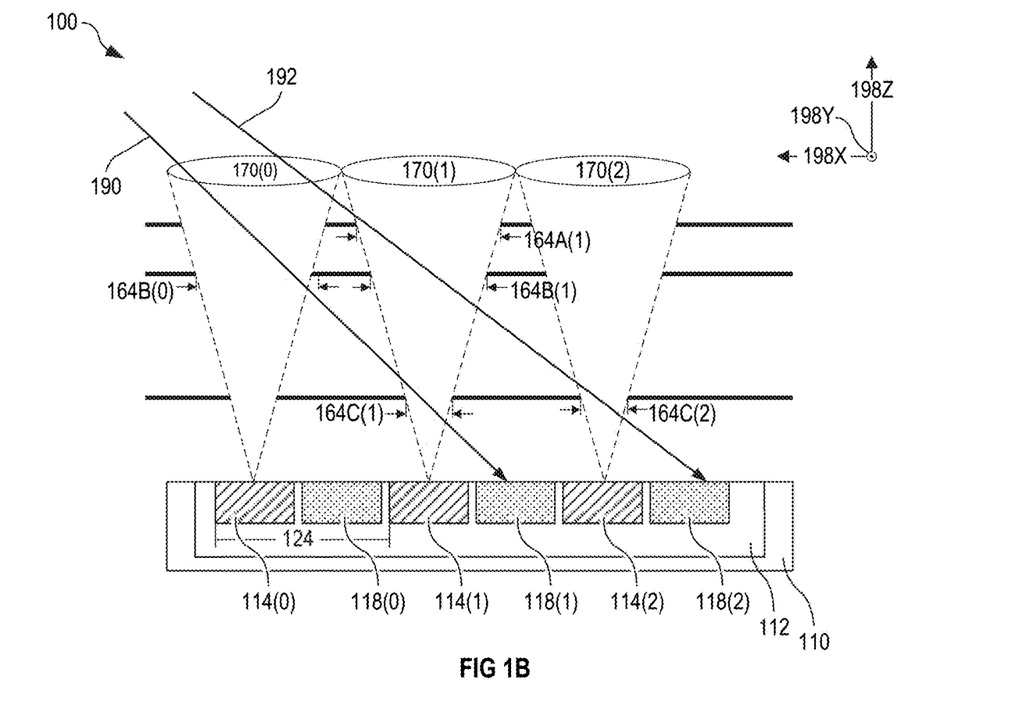

FIGS. 1A and 1B illustrate a cross-sectional side view of an optical fingerprint sensor 100 that detects electromagnetic energy with a plurality of second photodiodes 118 to identify spoof fingerprints. Second diodes 118 are also referred to as anti-spoof photodiodes herein. The cross section illustrated in FIGS. 1A and 1B is parallel to a plane, hereinafter the x-z plane, formed by orthogonal axes 198X and 198Z, which are each orthogonal to an axis 198Y. A plane, hereinafter the x-y plane, formed by orthogonal axes 198X and 198Y, and planes parallel to the x-y plane are referred to as horizontal planes. Unless otherwise specified, heights of objects herein refer to the object's extent along axis 198Z. Herein, a reference to an axis x, y, or z refers to axes 198X, 198Y, and 198Z respectively. Also, herein, a width refers to an object's extent along the x axis, a depth refers to an object's extent along the y axis, a thickness (of thinness) refers to an object's extent along the z axis, and vertical refers to a direction along the z axis. Also, herein, above refers to a relative position a distance away along the axis 198Z in the positive direction and below refers to a relative position a distance away along the axis 198Z in the negative direction. FIGS. 1A and 1B are best viewed together.

Optical fingerprint sensor 100 includes a plurality of lenses 170, an image sensor 110, and at least one apertured baffle-layers 160. The plurality of lenses 170 includes J lenses, 170(m=0), 170(1), 170(2) . . . 170(J–1). Each lens 170 has a lens width 172 and the plurality of lenses 172 has a lens pitch 173 along a horizontal direction. The horizontal direction In FIGS. 1A and 1B the lens width 172 and lens pitch 173 are equal but the lens width 172 may be smaller than the lens pitch 173 without departing from the scope hereof. The lens 170(0) has a lens axis 174 that is parallel to the axis 198Z. The plurality of lenses 170 is positioned above a light-sensitive surface 116 of the image sensor 110. The image sensor 110 includes a pixel array 112 that includes a plurality of first photodiodes 114 that contains J photodiodes, 114(m=0), 114(1), 114(2) . . . 114(J–1). The plurality of first photodiodes 114 has a first photodiode pitch 124 that, in an embodiment illustrated in FIGS. 1A and 1B, is equal to the lens pitch 173 in the horizontal direction. A line that connects an optical center of each lens 170 and a center 122 of a light-sensitive surface 117 of each first photodiode 114 forms an optical axis 176 of a plurality of optical axes 176. In an embodiment, each optical axis of the plurality of optical axes 176 is normal to the light sensitive surface 116 and each lens 170 has a lens axis 174 aligned with the optical axis 176 of the respective first photodiode 114. In an embodiment, the optical axis 176(m) of each lens 170(m) depends on the horizontal location of the lens 170(m). In a so-called "fan-out" design, a lens 170(m) aligned with photodiode 114(m) near center of the pixel array 112 has optical axis 176(m) that is substantially normal to the light-sensitive surface 116 but lens 170(n) aligned with photodiode 114(n) near the edge of the pixel array 112 has optical axis 176(n) angled with respect to the surface normal of the light sensitive surface 116. In the embodiment illustrated in FIGS. 1A and 1B, the distance between each lens 170 and the corresponding first photodiode 114 is configured along with the focal length of the lens 170 such that collimated electromagnetic energy incident on the lens 170 from the positive z direction and parallel to the optical axis 176 will be focused to the center 122 of first photodiode 114. The plurality of first photodiodes 114 record light that is reflected from a fingerprint sample that is then used to generate a fingerprint image. In an embodiment, each first photodiode 114 is a sub-array of the pixel array 112 including more than one photodiode.

Each apertured baffle-layers 160 is positioned between the plurality of lenses 170 and the image sensor 110. Each of the at least one apertured baffle-layer 160 is located a respective height 162 above the pixel array 112. The embodiment illustrated in FIGS. 1A and 1B includes three apertured baffle-layers, 160A, 160B, and 160C that are a height 162A, 162B, and 162C, respectively, above the pixel array 112. The optical fingerprint sensor 100 may have more or fewer apertured baffle-layers 160 without departing from the scope hereof. The relative spacing and height of each apertured baffle-layer 160 above the pixel array 112 is for illustrative purposes and is not meant to limit the possible configurations of the apertured baffle-layers 160 within the optical fingerprint sensor 100.

Each apertured baffle-layer 160 has a respective plurality of apertures stops 164 that contains J aperture stops, 164A (m=0), 164A(1), 164A(2) . . . A164A(J–1). Each aperture stop 164 is center-aligned with a given first photodiode 114 along the corresponding optical axis 176. For example apertures stops 164A(0), 164A(1), and 164A(2) of apertured baffle-layer 160A are center-aligned with respective optical axes 176(0), 176(1), and 176(2). Some optical axes are not illustrated for clarity of illustration. In the embodiment illustrated in FIGS. 1A and 1B, the aperture stops 164A(1), 164B(1), and 164C(1) are center-aligned with the optical axis 176(1), not shown for clarity of illustration.

The pixel array 112 includes the plurality of second photodiodes 118 that contains k photodiodes, 118(k=0), 118(1), 118(2) . . . 118(k–1). The plurality of second photodiodes 118 is intercalated with the plurality of first photodiodes 114 such that a second photodiode 118(k) is between first photodiode 114(m) and first photodiode 114(m+1) in the horizontal direction. Each second photodiode 118 is configured to detect electromagnetic energy having passed through lens $L_m$ and at least one aperture stop $A_{x \neq m}$ not aligned with $L_m$ along the optical axis $O_m$. This is illustrated in FIG. 1B. A ray of electromagnetic energy 190 passes through lens 170(m=0) and through aperture stop 164C(m=1). Another ray of electromagnetic energy 192 passes through lens 170(m=0) and through aperture stops 164A(m=1), A164B(m=1) and 164C(m=2). Both rays of electromagnetic energy 190 and 192 are detected by a second photodiode (118(1) and 118(2), respectively) of the plurality of second photodiodes 118. In an embodiment, each second photodiode 118 is a sub-array of the pixel array 112 including more than one photodiode Electromagnetic energy detected by the plurality of second photodiodes 118 enters the optical fingerprint sensor 100 with a large angle of incidence with respect to the optical axis 176. This large-angle electromagnetic energy is quantified here as incoming electromagnetic energy incident on lens 170(m) with an angle of incidence divergent from the optical axis 176(m) by greater than five degrees.

In an embodiment, each of the apertured baffle-layers 160 is opaque to visible electromagnetic energy, for example, light incident on the apertured baffle-layer 160 between adjacent apertures stops of the plurality of aperture stops 164. This reduces the number of paths that incoming electromagnetic energy may take and still be incident on the plurality of first photodiodes 114. As discussed earlier, each apertured baffle-layers 160 helps the optical fingerprint sensor 100 record an image of a fingerprint sample.

Figure 2:
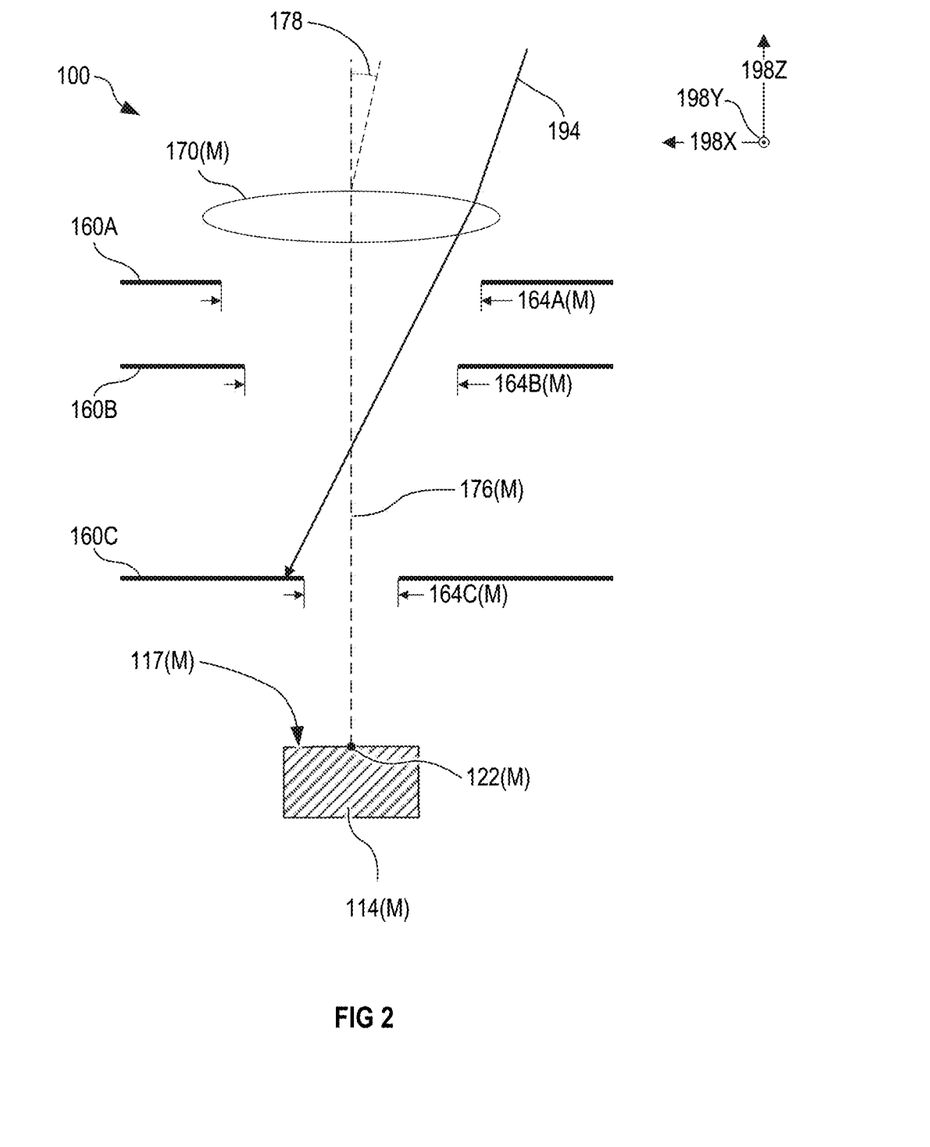
FIG. 2 is a schematic cross-sectional view of part of the optical fingerprint sensor of FIGS. 1A and 1B, according to an embodiment.

FIG. 2 is a schematic cross-sectional view of part of optical fingerprint sensor 100 including the first photodiode 114(m), center 122(m) of the light-sensitive surface 117, along with lens 170(m), optical axis 176(m), and sections of the least one apertured baffle-layers 160A, 160B, and 160C that include apertures stops 164A(m), 164B(m), and 164AC (m) respectively.

Each of the aperture stops 164A(m), 164B(m), and 164C(m) illustrated in FIG. 2 is center-aligned with the optical axis 176(m). Each aperture stop 164A(m), 164B(m), and 164C(m) has a width such that they collectively transmit electromagnetic energy incident on the lens 170(m) that falls within an acceptance angle 178, which is measured as an angular divergence from the optical axis 176(m) of rays incident on the lens 170(m). A ray of electromagnetic energy 194 with incident angle larger than the acceptance angle 178 is prevented from striking the first photodiode 114(m) when it is incident on the apertured baffle-layer 160C. In an embodiment, each aperture stop of the plurality of aperture stops 164 on each of the at least one apertured baffle-layers is circular in a horizontal plane.

Figure 3:
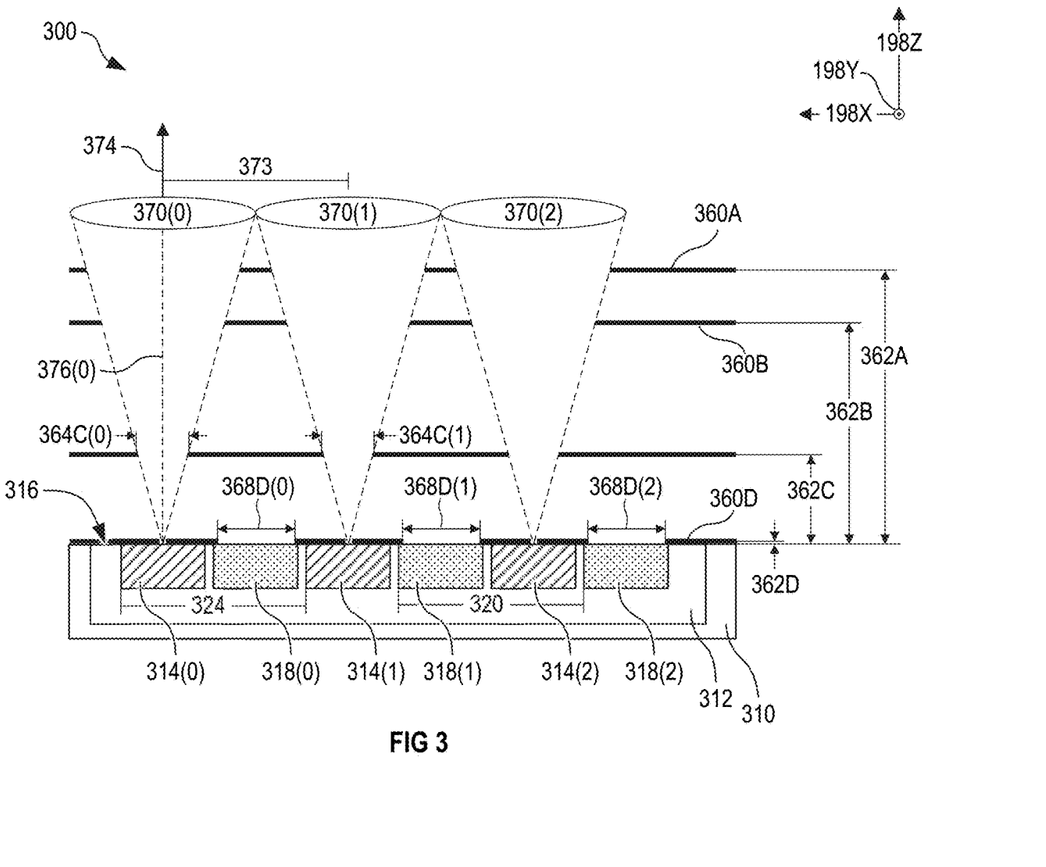
FIG. 3 is a schematic cross-sectional view of the optical fingerprint sensor of FIGS. 1A and 1B with a fourth apertured baffle-layer that is less than ten microns above the light-sensitive surface of the image sensor, according to an embodiment.

FIG. 3 is a schematic cross-sectional view of an optical fingerprint sensor 300 that is an example of the optical fingerprint sensor 100 of FIG. 1. In the embodiment illustrated in FIG. 3, at least one apertured baffle-layer 360 includes a fourth apertured baffle-layer 360D having a distance 362D less than ten microns above a light-sensitive surface 316 of an image sensor 310. The apertured baffle-layer 360D has a plurality of aperture stops 364 with J apertures stops 364D(0), 364D(1) . . . 364D(J−1) (not indicated) like those illustrated in FIGS. 1A, 1B, and 2. Apertured baffle-layer 360D further includes a plurality of second aperture stops 368 with K aperture stops 368D(0), 368D(1) . . . 368D(K−1), there being one second aperture stop 368 for each second photodiode 318 of a plurality of second photodiodes 318. Each second aperture stop 368 is center-aligned with a center of a light-sensitive surface (not indicated) of a respective second photodiode 318 in a direction parallel to an optical axis 374, as illustrated in FIG. 3. The plurality of second aperture stops 368 on apertured baffle-layer 360D permit electromagnetic energy to be detected by the plurality of second photodiodes 318 while further restricting the paths available that allow electromagnetic energy to be detected by a plurality of first photodiodes 314. The distance 362D may be varied depending on the fabrication processes used and the tolerances associated with those processes.

In an embodiment, the number of first photodiodes 314 is equal to the number of second photodiodes 318. Accordingly, the number of lenses 370, the number of apertures stops on each apertured baffle-layer 360, and the number of second aperture stops 368 are also equal, both to each other and to the number of first photodiodes 314 and to the number of second photodiodes 318. More succinctly, the counters above, J and K, are equal. This need not be the case, however. The relative quantity of first photodiodes 314 and second photodiodes 318 may vary without departing from the scope hereof.

FIG. 3 illustrates an embodiment where the plurality of second photodiodes 318 has a second photodiode pitch 320 that is equal to the first photodiode pitch 324 and to the lens pitch 373 in the horizontal direction. The first photodiode pitch 324 and the second photodiode pitch 320 need not be equal, however, and embodiments may have larger or small second photodiode pitch 320 relative to first photodiode pitch 324 without departing from the scope hereof. In an embodiment, each second photodiode 318 is wider than each first photodiode 314 and/or has a larger depth. The relative width and depth of each first photodiode 314 to each second photodiode 318 may vary without departing from the scope hereof.

Figure 4:
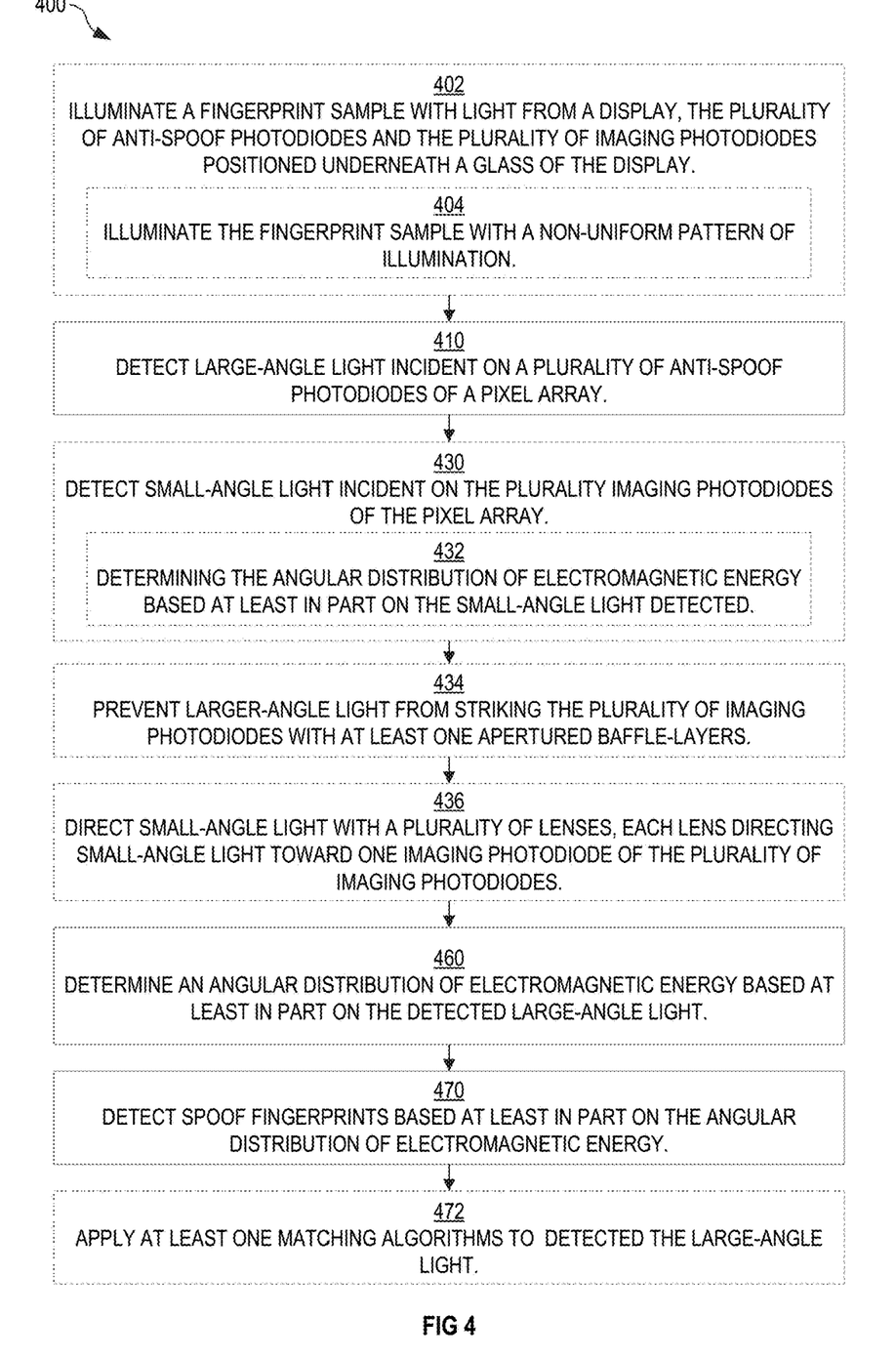
FIG. 4 is a flowchart illustrating a method for detecting spoof fingerprints using a plurality of anti-spoof pixels, the method may be used in conjunction with the optical fingerprint sensor of FIG. 1A, 1B, 2, or 3, in embodiments.

FIG. 4 is a flowchart illustrating a method 400 for detecting spoof fingerprints using a plurality of anti-spoof pixels. Method 400 may be implemented by any one of the optical fingerprint sensors 100 or 300 of FIGS. 1A, 1B, 2, and 3. Method 400 includes blocks 410, 460, and 470. In embodiments, method 400 also includes at least one of blocks 402, 404, 430, 432, 434, 436, and 472.

In block 410, large-angle light incident on a plurality of anti-spoof photodiodes of a pixel array is detected. Large-angle electromagnetic energy is quantified here as incoming electromagnetic energy incident on a lens with an angle of incidence divergent from the optical axis of the lens by greater than five degrees. The plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes. In an example of block 410, rays of electromagnetic energy 190 and 192 are detected by second photodiodes (118(1) and 118(2), respectively) of the plurality of second photodiodes 118.

In block 460, an angular distribution of electromagnetic energy is determined at least in part on the detected large-angle light. In one example of block 460, an angular distribution of electromagnetic energy is determined, at least in part by rays of electromagnetic energy 190 and 192 that are detected by the plurality of second photodiodes 118.

In block 470, spoof fingerprints are detected based at least in part on the angular distribution of electromagnetic energy.

Figure 5:
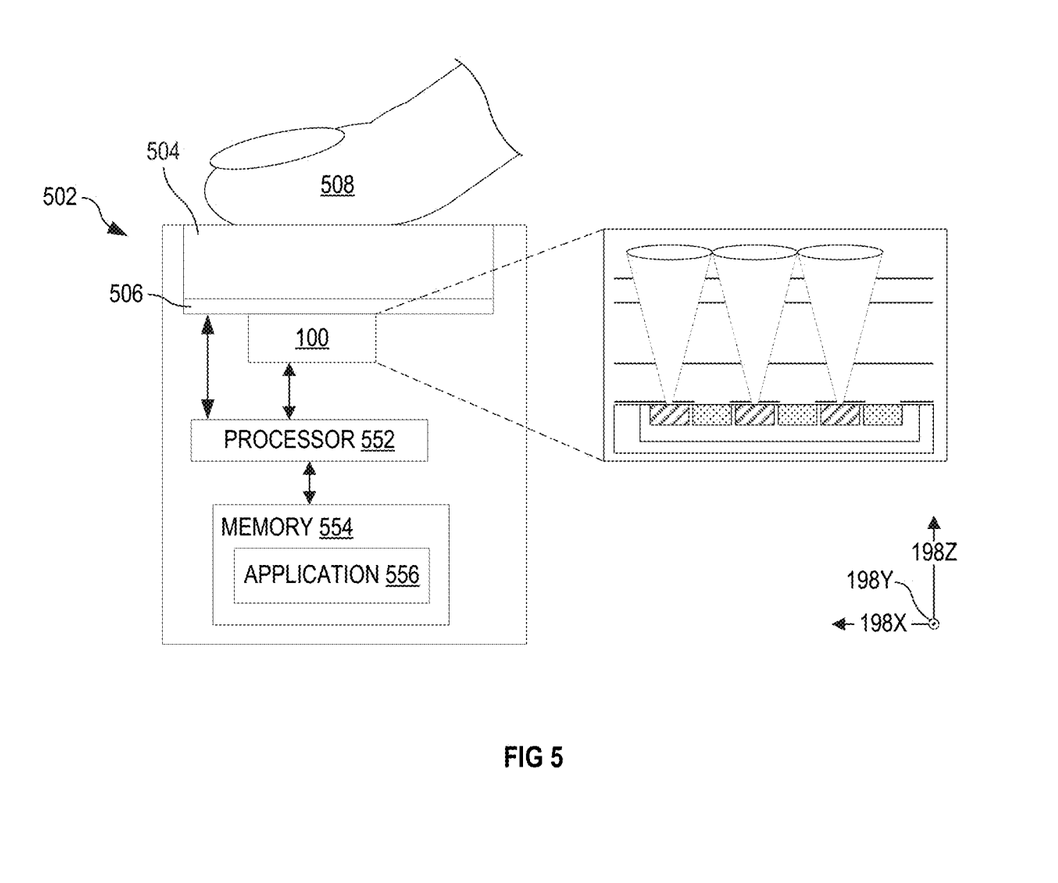
FIG. 5 illustrates a finger being scanned by the optical fingerprint sensor of FIGS. 1A and 1B installed below the screen of a mobile device, according to an embodiment.

In certain embodiments, the method 400 includes one or more additional blocks of the flowchart in FIG. 4. In block 402, a fingerprint sample is illuminated with electromagnetic energy from a display and the plurality of anti-spoof photodiodes and the plurality of imaging photodiodes are positioned underneath a glass of a display. One example of a device implementing block 402 is illustrated in FIG. 5, described below. In block 404, the fingerprint sample is illuminated with a non-uniform pattern of illumination, which aids in determining the angular distribution of electromagnetic energy in block 460.

In block 430, small-angle light incident on the plurality imaging photodiodes of the pixel array is detected, small-angle electromagnetic energy is quantified here as incoming electromagnetic energy incident on a lens with an angle of incidence divergent from the optical axis of the lens by less than five degrees. In an example of block 430, electromagnetic energy is transmitted through lens 170(0) and then passes through aperture stops 164A(0), 164B(0), and 164C(0) before being detected by first photodiode 114(0).

Block 430 may include block 432, in which the angular distribution of electromagnetic energy is determined at least in part based on the small-angle light detected. In one example of block 432, an angular distribution of electromagnetic energy is determined at least in part based on (i) electromagnetic energy propagating through lens 170(0) and then passes through aperture stops 164A(0), 164B(0), and 164C(0) before being detected by first photodiode 114(0) and (ii) electromagnetic energy 190 and 192 that is detected by second photodiodes (118(1) and 118(2), respectively) of the plurality of second photodiodes 118 of FIG. 1B.

In block 434, large-angle light is prevented from striking the plurality of imaging photodiodes using at least one apertured baffle-layer. In an example of block 434, the ray of electromagnetic energy 194 is prevented from reaching the first photodiode 114(m) by the apertured baffle-layer 160A, FIG. 2.

In block 436, small-angle light is directed with a plurality of lenses, in which a lens directs small-angle light toward one imaging photodiode of the plurality of imaging photodiodes. In an example of block 436, electromagnetic energy is transmitted through lens 170(0) and then passes through aperture stops 164A(0), 164B(0), and 164C(0) before being detected by first photodiode 114(0), FIG. 1A.

In block 472, at least one matching algorithm is applied to the detected large-angle light. In an embodiment, the at least one matching algorithm includes machine learning algorithms.

FIG. 5 illustrates the optical fingerprint sensor 100 installed in a mobile device 502 below a display including a cover glass 504 and a light-emitting layer 506. A fingerprint sample 508 is being scanned by the optical fingerprint sensor 100, which is shown in more detail in an inset to the right. In an embodiment, the mobile device 502 may be a mobile phone, tablet, or other electronic device with a display. In an embodiment, the light-emitting layer 506 illuminates the fingerprint sample 508 with a non-uniform pattern of illumination including one or more of (i) alternating light and dark lines, (ii) square spots of illumination, and (iii) illuminating only portions of the fingerprint sample for example only one edge of the fingerprint sample. The non-uniform pattern of illumination aids in determining the angular distribution emitted by the fingerprint sample 508.

Electronic device 502 includes at least one processor 552 communicatively coupled to display 502, optical fingerprint sensor 100/300, and memory 554 storing an application 556 (e.g., software/firmware) that include machine readable instructions that, when executed by processor 552, control display 502 and optical fingerprint sensor 100/300 to capture an image of a finger 508 touched to cover lens 504 proximate optical fingerprint sensor 100/300 to detect when fingerprint sample 508 is a spoof fingerprint.

Figure 6A:
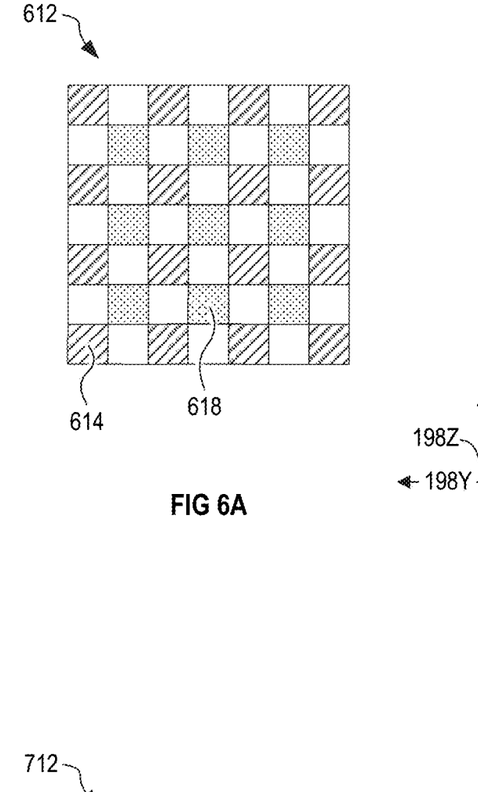
FIG. 6A illustrates a cross-sectional top view of a pixel array that is an example of the pixel array of FIG. 3, according to an embodiment.
Figure 6B:
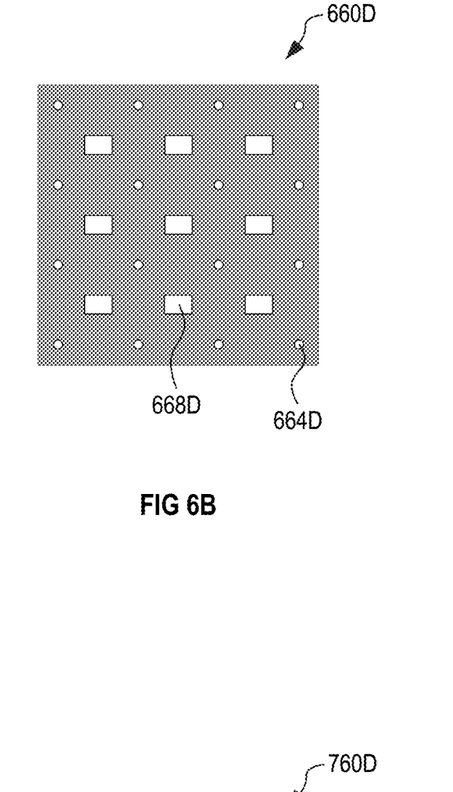
FIG. 6B illustrates a top view of an apertured baffle layer that is an example of the apertured baffle-layer of FIG. 3, according to an embodiment.

FIG. 6A is a cross-sectional top view of a pixel array 612 that is an example of pixel 312 of optical fingerprint sensor 300 of FIG. 3. FIG. 6B illustrates a top view of an apertured baffle-layer 660D that is an example of apertured baffle-layer 360D of optical fingerprint scanner 300 of FIG. 3. The cross section illustrated in FIG. 6A and the top view illustrated in 6B are parallel to the x-y plane formed by orthogonal axes 198X and 198Y. FIGS. 6A and 6B are best viewed together.

The pixel array 612 includes a plurality of first photodiodes 614 (shown filled with diagonal lines) and a plurality of second photodiodes 618 (shown filled with dots). The apertured baffle-layer 660D includes a plurality of aperture stops 664D (circular holes), there being one first aperture stop 664D for each first photodiode 614. Apertured baffle-layer 660D further includes a plurality of second aperture stops 668D (rectangular holes), there being one second aperture stop 668D for each second photodiode 618. The apertured baffle-layer 660D is designed to be positioned above the pixel array 612 such (a) that the center of each first aperture stop 664D is center-aligned with a center of a light-sensitive surface (not indicated) of a respective first photodiode 614 in a direction parallel to an optical axis 676 of each first photodiode 614 and (b) that the center of each second aperture stop 668D is center-aligned with a center of a light-sensitive surface (not indicated) of a respective second photodiode 618. The plurality of first aperture stops 664D on apertured baffle-layer 660D permit small angle-angle light (not shown) to be detected by the plurality of first photodiodes 416 and the plurality of second aperture stops 668D on apertured baffle-layer 660D permits large-angle light (not shown) to be detected by the plurality of second photodiodes 618. Due to the relative amount of small-angle light that reaches each first photodiode 614 to large-angle light that reaches each second photodiode 618, the area of each second aperture stop 668D is larger than that of each first aperture stop 664D. In the embodiment illustrated in FIG. 6A, the relative area of each first aperture stop 664D to each second aperture stop 668D is selected so that the detected light intensity of each first photodiode 614 is 20 times larger than the detected light intensity of each second photodiode 618 during a single exposure to a fingerprint sample (not shown). This corresponds to a ratio of 5:1 for the area of each second aperture stop 668D to the area of each first aperture stop 664D. This ratio may be larger or smaller without departing from the scope hereof. The unfilled squares of pixel array 612 (shown filled with white) are unused photodiodes in the embodiment shown in FIGS. 6A and 6B. This reduces the potential resolution of the pixel array 612 but advantageously reduces crosstalk between photodiodes, which reduces noise.

The pixel array 612 is an example of the pixel array 312 of FIG. 3, including only certain components from the description of FIG. 3. The pixel array 612, plurality of first photodiodes 614, plurality of second photodiodes 618, apertured baffle-layer 660D, plurality of first aperture stops 664D, and plurality of second apertures stops 668D are examples of pixel array 312, plurality of first photodiodes 314, plurality of second photodiodes 318, apertured baffle-layer 360D, plurality of first aperture stops 364D, and plurality of second apertures stops 368D of FIG. 3, respectively, and the descriptions of each respective element apply between the two figures.

Figure 7A:
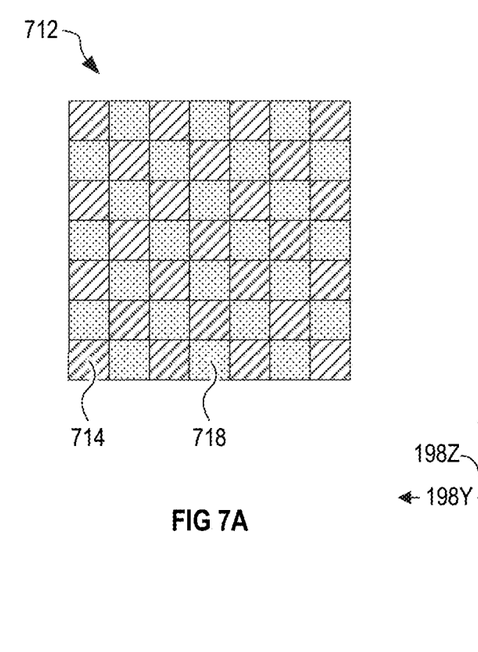
FIG. 7A illustrates a cross-sectional top view of a pixel array that is an example of the pixel array of FIG. 3, according to an embodiment.
Figure 7B:
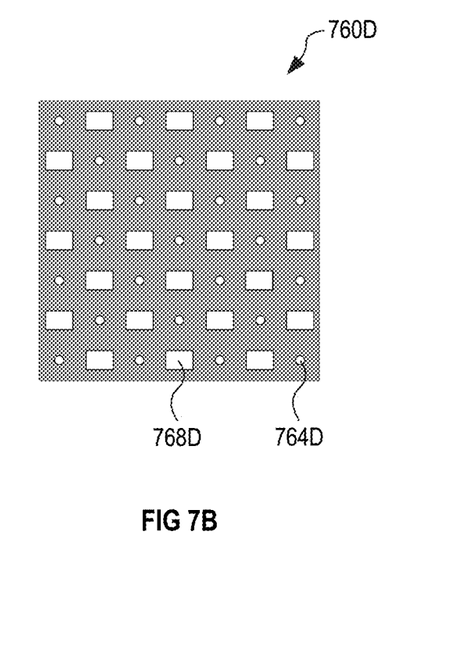
FIG. 7B illustrates a top view of an apertured baffle layer that is an example of the apertured baffle-layer of FIG. 3, according to an embodiment.

FIG. 7A is a cross-sectional top view of a pixel array 712 that is an example of pixel 312 of optical fingerprint sensor 300 of FIG. 3. FIG. 7B illustrates a top view of an apertured baffle-layer 760D that is an example of apertured baffle-layer 360D of optical fingerprint scanner 300 of FIG. 3. The cross section illustrated in FIG. 7A and the top view illustrated in 7B are parallel to the x-y plane formed by orthogonal axes 198X and 198Y. FIGS. 7A and 7B are best viewed together.

The pixel array 712 includes a plurality of first photodiodes 714 (shown filled with diagonal lines) and a plurality of second photodiodes 718 (shown filled with dots). The apertured baffle-layer 760D includes a plurality of aperture stops 764D (circular holes), there being one first aperture stop 764D for each first photodiode 714. Apertured baffle-layer 760D further includes a plurality of second aperture stops 768D (rectangular holes), there being one second aperture stop 768D for each second photodiode 718. The apertured baffle-layer 760D is designed to be positioned above the pixel array 712 such (a) that the center of each first aperture stop 764D is center-aligned with a center of a light-sensitive surface (not indicated) of a respective first photodiode 714 in a direction parallel to an optical axis 776 of each first photodiode 714 and (b) that the center of each second aperture stop 768D is center-aligned with a center of a light-sensitive surface (not indicated) of a respective second photodiode. The plurality of first aperture stops 764D on apertured baffle-layer 760D permit small angle-angle light (not shown) to be detected by the plurality of first photodiodes 416 and the plurality of second aperture stops 768D on apertured baffle-layer 760D permits large-angle light (not shown) to be detected by the plurality of second photodiodes 718. Due to the relative amount of small-angle light that reaches each first photodiode 714 to large-angle light that reaches each second photodiode 718, the area of each second aperture stop 768D is larger than that of each first aperture stop 764D. In the embodiment illustrated in FIG. 7A, the relative area of each first aperture stop 764D to each second aperture stop 768D is selected so that the detected light intensity of each first photodiode 714 is 20 times larger than the detected light intensity of each second photodiode 718 during a single exposure to a fingerprint sample (not shown). This corresponds to a ratio of 5:1 for the area of each second aperture stop 768D to the area of each first aperture stop 764D. This ratio may be larger or smaller without departing from the scope hereof. Pixel array 712 includes no unused photodiodes (like those shown filled with white in pixel array 612 of FIG. 6A), which advantageously increases the resolution of the pixel array 712 but may disadvantageously permit crosstalk between photodiodes leading to noise. Other configurations of first photodiodes 714 and second photodiodes 718 within the pixel array 712 allow optimization between resolution and sensitivity based on the requirements of the pixel array 712 and do not depart from the scope hereof.

The pixel array 712 is an example of the pixel array 312 of FIG. 3, including only certain components from the description of FIG. 3. The pixel array 712, plurality of first photodiodes 714, plurality of second photodiodes 718, apertured baffle-layer 760D, plurality of first aperture stops 764D, and plurality of second apertures stops 768D are examples of pixel array 312, plurality of first photodiodes 314, plurality of second photodiodes 318, apertured baffle-layer 360D, plurality of first aperture stops 364D, and plurality of second apertures stops 368D of FIG. 3, respectively, and the descriptions of each respective element apply between the two figures.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features (A1) In a first aspect, an optical fingerprint sensor with spoof detection includes a plurality of lenses $L_{m=0}, L_1, \ldots L_{J-1}$ with a lens pitch along a horizontal direction that is orthogonal to a lens axis of lens $L_0$, each lens having a width; an image sensor includes a pixel array that includes a plurality of first photodiodes $I_{m=0}, I_1, \ldots I_{J-1}$ with a first photodiode pitch that is equal to the lens pitch in the horizontal direction, a line between a center of a light-sensitive surface of each first photodiode $I_m$ and an optical center of each lens $L_m$ forms an optical axis $O_m$ of a plurality of optical axes $O_{m=0}, O_1, \ldots O_{J-1}$; at least one apertured baffle-layer positioned between the image sensor and the plurality of lenses, each of the at least one apertured baffle-layer located at a respective height $z_k$ above the pixel array and each having a respective plurality of aperture stops $A_{m=0}, A_1, \ldots A_{J-1}$, each aperture stop $A_m$ being center-aligned with the optical axis $O_m$; and a plurality of second photodiodes $S_{m=0}, S_1, \ldots S_{K-1}$ that is included in the pixel array, the plurality of second photodiodes is intercalated with the plurality of first photodiodes such that a second photodiode $S_m$ is between first photodiode $I_m$ and first photodiode $I_{m+1}$ in the horizontal direction, wherein each second photodiode is configured to detect electromagnetic energy having passed through lens $L_m$ and at least one aperture stop $A_{x \neq m}$ not aligned with $L_m$ along optical axis $O_m$ (A2) In an embodiment of A1, between adjacent aperture stops of the plurality of apertures stops, each of the at least one apertured baffle-layer being opaque to visible electromagnetic energy.

(A3) In an embodiment of A2, the at least one aperture stop $A_m$ aligned along the optical axis $O_m$ having respective widths such that at least one aperture stops $A_m$ collectively transmit electromagnetic energy that falls within an acceptance angle, the acceptance angle measured as an angular divergence from the optical axis $O_m$ of rays incident on the center of the light-sensitive surface of the first photodiode $I_m$.

(A4) In an embodiment of any of A1 through A3, each aperture stop of the plurality of aperture stops on each of the at least one apertured baffle-layers being circular in the horizontal plane.

(A5) In an embodiment of any of A1 through A4, one of the at least one apertured baffle-layer having a distance $z_k$ equal less than ten microns and having a plurality of second aperture stops $SA_{m=0}, SA_1, \ldots SA_{K-1}$ having a second aperture stop $SA_m$ for each second photodiode $S_m$, each second aperture stop $SA_m$ center-aligned with a center of a light-sensitive surface of each second photodiode $S_m$ in a direction parallel to the optical axis $O_m$.

(A6) In an embodiment of any of A1 through A5, the at least one apertured baffle-layer includes four baffle-layers.

(A7) In an embodiment of any of A1 through A6, the number first photodiodes, J, being equal to the number of second photodiodes, K.

(A8) In an embodiment of any of A1 through A7, the plurality of second photodiodes having a second photodiode pitch that is equal to the lens pitch in the horizontal direction.

(B1) In a second aspect, a method for detecting spoof fingerprints detected using an optical fingerprint sensor includes detecting large-angle light incident on a plurality of anti-spoof photodiodes of a pixel array, large-angle light being incoming electromagnetic energy incident on lens above the pixel array with an angle of incidence divergent from the optical axis of the lens by greater than five degrees; wherein the plurality of anti-spoof photodiodes is interleaved with a plurality of imaging photodiodes such that each anti-spoof photodiode of the plurality of anti-spoof photodiodes is between adjacent imaging photodiodes of the plurality of imaging photodiodes; determining an angular distribution of electromagnetic energy based at least in part on the detected large-angle light; and detecting spoof fingerprints based at least in part on the angular distribution of electromagnetic energy.

(B2) In an embodiment of B1, the plurality of anti-spoof photodiodes and the plurality of imaging photodiodes being formed in a single pixel array.

(B3) In an embodiment of either B1 or B2, the method further includes detecting small-angle light incident on the plurality imaging photodiodes of the pixel array, small-angle light being incoming electromagnetic energy incident on a lens above the pixel array with an angle of incidence divergent from the optical axis of the lens by greater than five degrees.

(B4) In an embodiment of B3, the step of determining further includes determining the angular distribution of electromagnetic energy based at least in part on the small-angle light detected.

(B5) In an embodiment of any of B1 through B4, the method further includes preventing larger-angle light from striking the plurality of imaging photodiodes with a plurality of apertured baffle-layers.

(B6) In an embodiment of any of B1 through B5, the method further includes directing small-angle light with a plurality of lenses, each lens directing small-angle light toward one imaging photodiode of the plurality of imaging photodiodes.

(B7) In an embodiment of any of B1 through B6, the method further includes illuminating a fingerprint sample with electromagnetic energy from a display, the plurality of anti-spoof photodiodes and the plurality of imaging photodiodes positioned underneath a glass of the display.

(B8) In an embodiment of B7, the method further includes illuminating the fingerprint sample with a non-uniform pattern of illumination.

(B9) In an embodiment of any of B1 through B8, the method further includes applying at least one matching algorithms to the detection of large-angle light.

(B10) In an embodiment of B9, the one of more matching algorithms includes machine learning algorithms.

What is claimed is:

1. An optical fingerprint sensor with spoof detection, comprising:
    a plurality of lenses $L_{m=0}, L_1, \ldots L_{J-1}$ with a lens pitch along a horizontal direction that is orthogonal to a lens axis of lens $L_0$, each lens having a width;
    an image sensor including a pixel array that includes a plurality of first photodiodes $I_{m=0}, I_1, \ldots I_{J-1}$ with a first photodiode pitch that is equal to the lens pitch in the horizontal direction, a line between a center of a light-sensitive surface of each first photodiode $I_m$ and an optical center of each lens $L_m$ forms an optical axis $O_m$ of a plurality of optical axes $O_{m=0}, O_1, \ldots O_{J-1}$;
    at least one apertured baffle-layer positioned between the image sensor and the plurality of lenses, each of the at least one apertured baffle-layer located at a respective height $z_k$ above the pixel array and each having a respective plurality of aperture stops $A_{m=0}, A_1, \ldots A_{J-1}$, each aperture stop $A_m$ being center-aligned with the optical axis $O_m$; and
    a plurality of second photodiodes $S_{m=0}, S_1, \ldots S_{K-1}$ that is included in the pixel array, the plurality of second photodiodes is intercalated with the plurality of first photodiodes such that a second photodiode $S_m$ is between first photodiode $I_m$ and first photodiode $I_{m+1}$ in the horizontal direction,
    wherein each second photodiode is configured to detect electromagnetic energy having passed through lens $L_m$ and at least one aperture stop $A_{x \neq m}$ not aligned with $L_m$ along optical axis $O_m$.

2. The optical fingerprint sensor of claim 1, between adjacent aperture stops of the plurality of apertures stops, each of the at least one apertured baffle-layer being opaque to visible electromagnetic energy.

3. The optical fingerprint sensor of claim 2, the at least one aperture stop $A_m$ aligned along the optical axis $O_m$ having respective widths such that at least one aperture stops $A_m$ collectively transmit electromagnetic energy that falls within an acceptance angle, the acceptance angle measured as an angular divergence from the optical axis $O_m$ of rays incident on the center of the light-sensitive surface of the first photodiode $I_m$.

4. The optical fingerprint sensor of claim 1, each aperture stop of the plurality of aperture stops on each of the at least one apertured baffle-layers being circular in the horizontal plane.

5. The optical fingerprint sensor of claim 1, one of the at least one apertured baffle-layer having a distance $z_k$ equal to less than ten microns and having a plurality of second aperture stops $SA_{m=0}, SA_1, \ldots SA_{K-1}$ having a second aperture stop $SA_m$ for each second photodiode $S_m$, each second aperture stop $SA_m$ center-aligned with a center of a light-sensitive surface of each second photodiode $S_m$ in a direction parallel to the optical axis $O_m$.

6. The optical fingerprint sensor of claim 1, the at least one apertured baffle-layer comprising four baffle-layers.

7. The optical fingerprint sensor of claim 1, the number first photodiodes, J, being equal to the number of second photodiodes, K.

8. The optical fingerprint sensor of claim 1, the plurality of second photodiodes having a second photodiode pitch that is equal to the lens pitch in the horizontal direction.

9. A method for detecting spoof fingerprints detected using the optical fingerprint sensor of claim 1, comprising:
    detecting large-angle light incident on the plurality of second photodiodes, large-angle electromagnetic energy being incoming electromagnetic energy incident on the lens with an angle of incidence divergent from the optical axis of the lens by greater than five degrees;
    determining an angular distribution of electromagnetic energy based at least in part on the detected large-angle light; and
    detecting spoof fingerprints based at least in part on the angular distribution of electromagnetic energy.

10. The method of claim 9, the plurality of second photodiodes are anti-spoof photodiodes and the plurality of first photodiodes are imaging photodiodes being formed in a single pixel array.

11. The method of claim 9, further comprising detecting small-angle light incident on the plurality first photodiodes of the pixel array, small-angle light being incoming electromagnetic energy incident on the lens with an angle of incidence divergent from the optical axis of the lens by less than five degrees.

12. The method of claim 11, the step of determining further comprising determining the angular distribution of electromagnetic energy based at least in part on the small-angle light detected.

13. The method of claim 9, further comprising preventing larger-angle light from striking the plurality of imaging photodiodes with a plurality of apertured baffle-layers.

14. The method of claim 9, further comprising directing small-angle light with a plurality of lenses, each lens directing small-angle light toward one first photodiode of the plurality of first photodiodes.

15. The method of claim 9, further comprising illuminating a fingerprint sample with electromagnetic energy from a display, the plurality of second photodiodes and the plurality of first photodiodes positioned underneath a glass of the display.

16. The method of claim 15, further comprising illuminating the fingerprint sample with a non-uniform pattern of illumination.

17. The method of claim 9, further comprising applying at least one matching algorithms to the detection of large-angle light.

18. The method of claim 17, the one of more matching algorithms comprising machine learning algorithms.

* * * * *